(12) United States Patent
Tecarro et al.

(10) Patent No.: US 9,400,601 B2
(45) Date of Patent: Jul. 26, 2016

(54) TECHNIQUES FOR PAGING THROUGH DIGITAL CONTENT ON TOUCH SCREEN DEVICES

(71) Applicant: Nook Digital, LLC, New York, NY (US)

(72) Inventors: Jaireh Tecarro, San Francisco, CA (US); Chen-Je Huang, Menlo Park, CA (US); David Jara, Chicago, IL (US); Saj Shetty, Freemont, CA (US); Matthew Pallakoff, Mountain View, CA (US)

(73) Assignee: Nook Digital, LLC, New York, NY (US)

( * ) Notice: Subject to any disclaimer, the term of this patent is extended or adjusted under 35 U.S.C. 154(b) by 306 days.

(21) Appl. No.: 13/924,321

(22) Filed: Jun. 21, 2013

(65) Prior Publication Data
US 2014/0380247 A1    Dec. 25, 2014

(51) Int. Cl.
*G06F 3/048* (2013.01)
*G06F 3/033* (2013.01)
*G06F 3/0488* (2013.01)
*G06F 3/0483* (2013.01)

(52) U.S. Cl.
CPC .......... *G06F 3/04883* (2013.01); *G06F 3/0483* (2013.01)

(58) Field of Classification Search
None
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,762,775 B2 * | 7/2004 | Ho | G06F 3/03547 715/701 |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Stephen Alvesteffer
(74) *Attorney, Agent, or Firm* — Finch & Maloney PLLC

(57) ABSTRACT

Techniques are disclosed for providing a page flipping mode in electronic touch sensitive devices. The user can engage the page flipping mode by performing an activation gesture, which causes the device to display a magazine page flipping mode or a fast page flipping mode. The page flipping modes may show paginated content such as an opened book or magazine in a single stack or side-by-side layout. The fast page flipping modes may show a single page lying relatively flat or somewhat curled with the edges of subsequent pages visible at the right edge of the page. A page flipping gesture may prompt an animation showing one or more pages folding up to display subsequent pages to the user. In some cases, the number of pages being flipped and/or the speed at which the pages are flipped, is dependent upon the speed and/or length and/or duration of the page flipping gesture.

20 Claims, 12 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2004/0201569 | A1* | 10/2004 | Seet ............... G06F 3/0483 345/156 |
| 2007/0047002 | A1 | 3/2007 | Hull et al. |
| 2008/0036747 | A1 | 2/2008 | Hope |
| 2008/0040692 | A1* | 2/2008 | Sunday et al. ............ 715/863 |
| 2010/0100854 | A1 | 4/2010 | Russell et al. |
| 2010/0175018 | A1* | 7/2010 | Petschnigg et al. ......... 715/776 |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0258542 | A1 | 10/2011 | Kenney et al. |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0327009 | A1* | 12/2012 | Fleizach ............ G06F 3/04883 345/173 |
| 2012/0329529 | A1 | 12/2012 | van der Raadt |
| 2013/0016045 | A1 | 1/2013 | Zhao et al. |
| 2013/0021281 | A1* | 1/2013 | Tse et al. ............... 345/173 |
| 2013/0036383 | A1 | 2/2013 | Yuan et al. |
| 2013/0055140 | A1* | 2/2013 | Mosquera et al. ........... 715/776 |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0111395 | A1* | 5/2013 | Ying ............... G06F 3/0483 715/783 |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |
| 2013/0227408 | A1* | 8/2013 | Shanmugarajah .. G06F 15/0291 715/277 |
| 2014/0123021 | A1* | 5/2014 | Walkin et al. ............. 715/746 |
| 2014/0258839 | A1* | 9/2014 | Hamilton, II ....... G06F 17/2247 715/234 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.

(56) References Cited

OTHER PUBLICATIONS engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.

\* cited by examiner

TECHNIQUES FOR PAGING THROUGH DIGITAL CONTENT ON TOUCH SCREEN DEVICES

FIELD OF THE DISCLOSURE

This disclosure relates to electronic display devices, and more particularly, to user interface (UI) techniques for interacting with touch screen devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
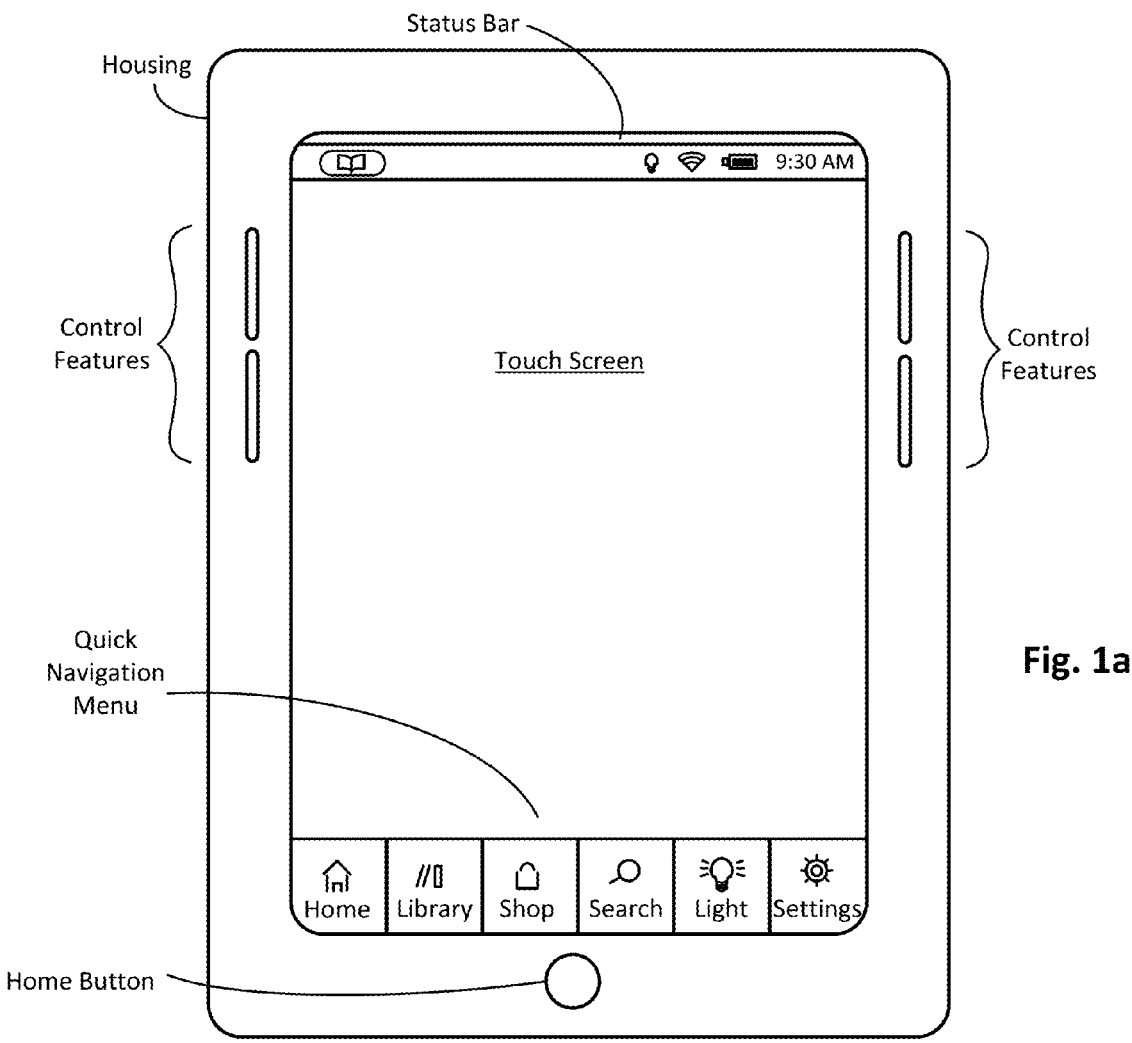
FIGS. 1a-b illustrate an example electronic touch screen device having a page flipping mode configured in accordance with an embodiment of the present invention.

Techniques are disclosed for providing a page flipping mode in electronic touch sensitive devices. The user can engage the page flipping mode by performing an activation gesture, which causes the device to display a magazine page flipping mode or a fast page flipping mode. In some embodiments, a distinct activation gesture may be used to enter either of the two page flipping modes. In some specific cases, the magazine page flipping mode may show paginated content as an opened book or magazine or other paginated content, with the left-hand pages lying relatively flat and the right-hand pages slightly curled, the way a physical magazine looks when a user is holding it and flipping through the pages. Other page layout configurations can be used as well, as will be further appreciated in light of this disclosure. The fast page flipping mode may show, for example, a single page stack with a virtual binding on the left side with the edges of subsequent pages visible at the right edge of the page assuming a left side virtual binding. Other embodiments may include other content layouts such as a single stack with a right side virtual binding, or a side-by-side layout with a center binding. A page flipping gesture may prompt an animation showing one or more pages folding up to reveal subsequent pages to the user. The page flipping gesture may be, for example, a right-to-left or a left-to-right swipe gesture and/or a press and hold gesture. The number of pages being flipped and/or the speed at which the pages are flipped, may be dependent upon the speed, length, and/or duration of the page flipping gesture. In some embodiments a number of areas of interest may be identified by the page flipping mode, and the page flipping speed may decrease or pause or stop when content related to those areas of interest is being displayed to the user. In some cases, the page flipping mode can skip pages that are not of interest, such that only pages including an area of interest are displayed.

General Overview

As previously explained, electronic display devices such as tablets, eReaders, and smart phones are commonly used for displaying user interfaces and consumable content. The user of such devices can typically consume the displayed content with relative ease. In some instances, the content being consumed may be divided into individual pages and the user may wish to preview or flip through the pages of a digital magazine or book as can be done with a physical book or magazine in a bookstore. While page flipping techniques are provided in touch screen devices which allow the user to advance one page at a time through content, a page flipping mode as variously described herein which allows the user to advance through multiple pages at a time may provide a more intuitive or otherwise positive user experience.

Thus, and in accordance with an embodiment of the present invention, page flipping techniques are disclosed for use in electronic touch screen devices. The content being read or otherwise consumed by the user may include, for example, magazines, notes, slides, paginated documents or files, eBooks, and/or any other paginated or similarly divided consumable content. Such page flipping techniques may allow a reader to use intuitive gestures to quickly preview the contents of a magazine or other paginated material without reading each and every page. In some embodiments, the user can engage the page flipping mode with an initial activation gesture on the touch screen device. The initial activation gesture may include, for example, a single swipe gesture, a pair of swipe gestures oriented toward opposing edges of the device (like opening up a magazine or book with both thumbs), a press and hold gesture on or near an edge of the content, or any uniquely identifiable touch screen gesture or combination of gestures. In some cases, the page flipping mode may include a magazine flipping function or a fast flip function, each of which may be activated with a distinct activation gesture.

In one embodiment, the user may activate a magazine flip function, so called because the user experience simulates the mechanical way that people open and quickly flip through a physical book or magazine or other paginated content. Such a mode mimics the speedy method that allows a reader to quickly get a brief overview of the paginated content, as might be done while browsing material in a bookstore. In one embodiment, the magazine flip function includes a gesture and animation system. An initial gesture may activate the magazine flip function. Note that the pages of the book or magazine may appear in either portrait or landscape, with both capable of displaying, for instance, a single stack layout or a side-by-side layout. In one embodiment, once the flip function is activated, the animation system may show the paginated content with an unbound side of the stacked pages slanted or staircased, so as to indicate to the user that they can quickly shuffle or rifle through the pages. For example, and assuming a single stack of pages is displayed that is virtually bound on the left side of the stack (near left edge of the device display), the unbound right side of the page stack may appear slanted (near right edge of the device display) so as to effectively provide an inclined or miniature staircase effect where each page edge of that unbound side provides one step in the staircase, much like a real book when splayed open on a table or in the hands of a reader. In another example, where the paginated content is displayed in a side-by-side layout with a center virtual binding and is read from left to right, the stack edge to the left of the virtual binding may appear straight (or slightly inclined, as the case may be) and the edge to the right of the virtual binding may appear to be slanted or staircased so as to encourage or otherwise indicate a quick thumbing/flipping through the content can be achieved with a gesture (e.g., swipe or press and hold) on or near that edge.

In some embodiments, the pages to the left of the virtual binding may be lying relatively flat and have a diminished appearance (either grayed out or slightly shaded), and the pages to the right side of the virtual binding may exhibit natural page-like qualities such as page curling and/or shading that varies with proximity to the binding area. Also, the edges of the next several (e.g., 3 to 30 pages) may be visible. The reader may then perform, for example, a swipe gesture from the bezel of the device inward, either toward the left or right, to turn the pages quickly forward or backward. The page flipping speed may increase or decrease based on the speed and/or length of the swipe gesture, or based on the distance of the swipe from the edge of the device. In another example embodiment, the reader may perform a press and hold gesture on or near the slanted edge to initiate page turning. The page flipping speed may increase or decrease based on, for example, the duration the swipe gesture is held (e.g., 1 page/2 seconds for the first 5 seconds of the press and hold gesture, then 10 pages/second for the next 4 seconds press and hold gesture, then 1 section/second for the next 3 seconds press and hold gesture, and then 1 chapter/second thereafter, until press and hold gesture is released. Numerous variations will be apparent in light of this disclosure.

In another embodiment, the user may activate an interest-based page flipping function which may alert the user to the presence of specific content on pages that are being flipped through. The page flipping techniques described herein allow a reader to quickly flip through paginated digital content, however, if the user flips the pages too quickly, content that might interest the user could be glanced over. An interest-based page flipping function allows users to identify what specific topics or items they are interested in so that the device may draw the users' attention to those topics or items if they are present in a magazine or book that the user is flipping through. In such case, the page flipping speed may decrease, briefly pause (e.g., 1 to 5 seconds) or come to a full stop at pages of interest. In still other cases, pages having no area of interest can be completely skipped, such that only pages of interest are displayed. In one specific example, the user may enter a number of products that are of particular interest, and if one or more of those products are present in a magazine which the user is flipping through the page flipping speed may slow down or stop on the page containing the products of interest. In another example, an area or point of interest in the digital content may include a product of interest, a chapter title page, or pages where the user has made notes, highlights, and/or annotations. Furthermore, the interest-based page flipping function may draw the user's attention by highlighting the specific products of interest that are present on the page. As used herein, highlighting may refer, for example, to any visual and/or aural indication of a content selection, which may or may not include a formatting change. In one particular embodiment, the highlighting function may outline a selected image or section of text, thus catching the user's attention so as not to miss content that the user is interested in.

Note that such interest-based page flipping as variously described herein can also be executed with respect to serial paginated content that includes single sheets/pages of content in a line rather than a stack, such that the content can effectively be scrolled across the screen in a serial fashion and in response to the page flip gesture as variously described herein. The speed of the scrolling can be controlled, for example, by modulating the distance of the contact point(s) of the flip gesture from the device bezel (e.g., close to the bezel is slow and farther from the bezel to scroll faster), or using other techniques described herein. Further note for serial paginated content that the display may show one page of the serial stream (1-up), two adjacent pages of the serial stream (2-up), three adjacent pages of the serial stream (3-up), and so on. The speed at which the stream of serial paginated content passes through the display area of the device can be controlled just as described with respect to page flipping a stack of paginated content.

The techniques have a number of advantages, as will be appreciated in light of this disclosure. For instance, in some cases, the techniques can be employed to provide a discreet and intuitive way for a user to interact with a device without overly distracting the user (or others nearby) from other events occurring during the interaction. For instance, in some such embodiments, a student attending a lecture (either live or via a network) can quickly and intuitively browse a textbook, lecture notes, slides, or other classroom materials using the page flipping techniques described herein. In such cases, for instance, the student can scroll or otherwise flip through many pages of digital content with fewer swipe gestures, rather than having to perform a separate gesture for each page turn. In one example embodiment, a professor might assign a portion of a textbook for students to study and might highlight certain sections or headings that are of greater importance. Furthermore, a student might highlight sections of a textbook, outline, or lecture notes that will require more detailed study. In such embodiments, when a student is reviewing digital content using an interest-based flipping technique, any highlighted content by the student or professor may be brought to the student's attention by decreasing or stopping the page flipping speed. In one such case, pages with no highlighted content (or other content of interest) can be skipped or otherwise excluded from the page flip animation. Thus, several quick page flipping gestures might allow a student to preview an entire class's notes without missing or overlooking any important topics.

In another embodiment, the user may activate a fast flip function, so called because the edges of several of the following (or preceding) pages are shown to the user and the user may perform a swipe or flick gesture to flip through the paginated content. In one embodiment, the fast flip function is activated using an initial swipe gesture from the right bezel of the device inwards, or through a press-and-hold gesture on the margin of a page. Once activated, the user may perform additional swipe or flick gestures to flip through the different pages of content. For example, a swipe gesture from the center of the page toward the right edge may flip through the subsequent pages of content, while a swipe gesture from the center of the page toward the left edge may flip through the previous pages of content, or vice versa. In some embodiments, when the user is flipping through the different pages, the original page may have a diminished appearance (e.g., grayed out, or slightly shaded), and only a portion of the adjacent pages (either subsequent or previous) may be exposed. An animation may show a portion of the original page folding or curling upward, exposing a portion of the pages being flipped through. In one embodiment, the animation system of the fast flip function imparts a springy quality, such that the natural tendency of the pages is to spring back to the original page and collapse or hide the exposed pages. As previously explained, the page flipping speed may increase or decrease based on the speed and/or length of the swipe gesture, or based on the distance of the swipe from the edge of the device, or the duration of a press and hold gesture at an edge of the content. In one embodiment, when the user completes the swipe or flick gesture and lifts their finger from the touch screen surface, the displayed graphic of paginated content will show the new page landed on as a result of the gesture. Alternatively, retracing the swipe gesture may cover the exposed pages and return to the original page view.

In another embodiment, the user may activate a page preview function which may allow the user to preview a portion of one or more of the pages before or after the current page. In one specific such embodiment, the user may hold one contact on the current page with the thumb, while performing an inward pinch gesture with another finger. When the user pinches the finger toward the thumb, in one embodiment, an animation may show the corner of the current page folding up, exposing the corner of one or more of the following pages. In some embodiments, the number of pages that are curled up may increase or decrease based on the speed or length of the pinching gesture. Such a function creates a user experience that mimics the action of flipping up a corner of a page in order to preview a portion of the following pages. Note that although the page preview function is described with reference to the user's thumb and index finger, the function may be performed with any two contact points whether they are fingers, styli, or some other suitable implements.

Given the global nature and/or uniqueness of the engagement mechanism, in accordance with some embodiments, the page flipping mode can be similarly invoked within multiple diverse applications (e.g., eBook, picture viewer, file manager, etc.) and without conflicting with other global gestures that might also be used by the device's operating system. The gestures can be performed, for example, with the tip of a finger or a stylus, or any other suitable implement capable of providing a detectable swipe gesture.

Architecture

Figure 1B:
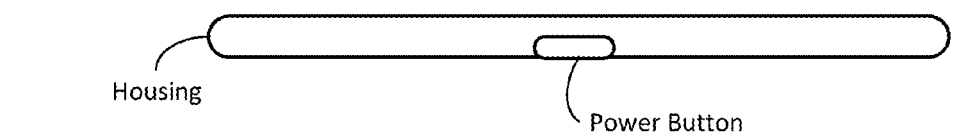

FIGS. 1*a-b* illustrate an example electronic touch sensitive device having a page flipping mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated, the claimed invention is not intended to be limited to any specific kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device (such as a page flipping mode), or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
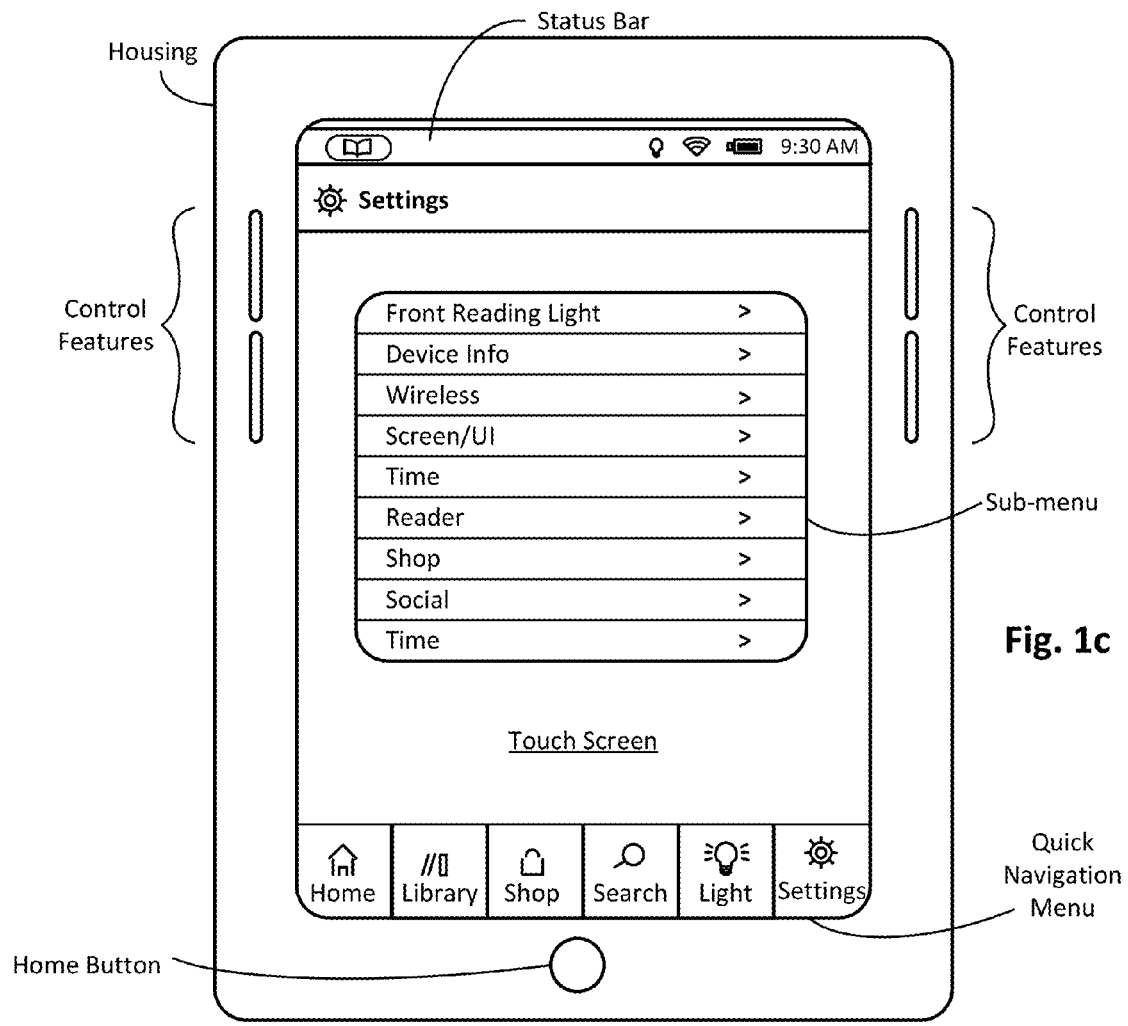
FIGS. 1c-d illustrate example configuration screen shots of the user interface of the electronic touch screen device shown in FIGS. 1a-b, configured in accordance with an embodiment of the present invention.
Figure 1D:
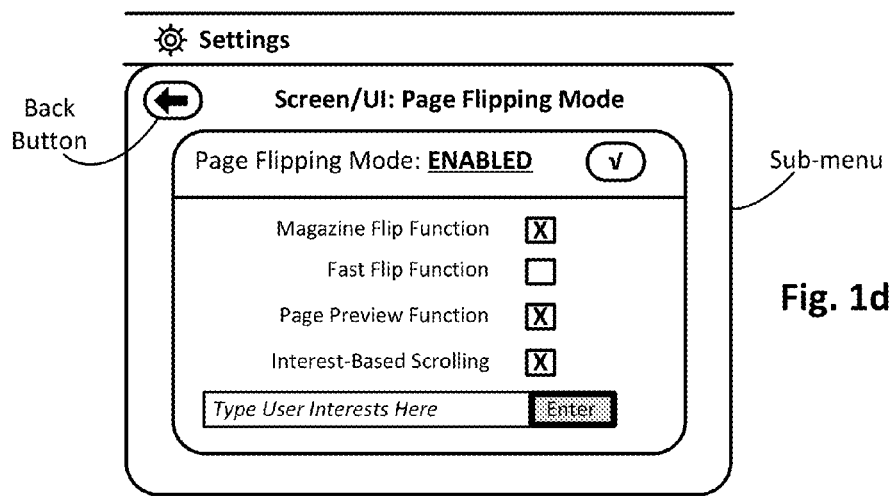

In one particular embodiment, a page flipping mode configuration sub-menu, such as the one shown in FIG. 1*d*, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu item may cause the configuration sub-menu of FIG. 1d to be displayed, in accordance with an embodiment. In other example embodiments, selecting the Screen/UI option may present the user with a number of additional sub-options, one of which may include a so-called "page flipping mode" option, which may then be selected by the user so as to cause the page flipping mode configuration sub-menu of FIG. 1d to be displayed. Any number of such menu schemes and nested hierarchies can be used, as will be appreciated in light of this disclosure. In other embodiments, the page flipping function is hard-coded such that no configuration sub-menus are needed or otherwise provided (e.g., scrolling or otherwise flipping through one or more pages of content depending on the speed or length of a particular swipe gesture as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, etc.). In some instances, note that the user need not actually physically touch the touch sensitive device to perform an action. For example, the touch screen display may be configured to detect input based on a finger or stylus hovering over the touch sensitive surface (e.g., within 3 inches of the touch screen). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the page flipping mode configuration sub-menu shown in FIG. 1d can be provided to the user. The user can configure a number of functions with respect to the page flipping mode, in this example embodiment. For instance, in this example case, the configuration sub-menu includes a UI check box that when checked or otherwise selected by the user, effectively enables the page flipping mode (shown in the enabled state); unchecking the box disables the mode. Other embodiments may have the page flipping mode always enabled, or enabled by a physical switch or button located on the device, for example. As previously explained, the page flipping mode may be implemented using a page flipping animation and optional sound effects.

With further reference to the example embodiment of FIG. 1d, the user may enable a magazine flip function using a UI check box or some other suitable selection method. As described above, the magazine flip function allows the user to open and flip through paginated content like one might browse through a physical book or magazine. Likewise, the user may enable a fast flip function, a page preview function, and an interest-based scrolling/flipping function using UI check boxes or other selection techniques. In the example shown in FIG. 1d, the user has enabled the magazine flip function, the page preview function, and the interest-based scrolling/flipping function. If the interest-based scrolling/flipping function is enabled, the user may type items or topics of particular interest so that the page scrolling/flipping speed will decrease or stop completely when those interests are detected in the content being browsed. In this particular example, the user may type the interests in the input bar provided in the configuration sub-menu and select the "Enter" button in order to save each interest. In other embodiments, a user or third party may identify certain sections of content to be of increased interest (e.g., by highlighting a section of text using a toolbar or options menu), such that the page flipping speed will decrease or stop when those sections are being flipped through.

In some example embodiments, the user may specify a number of applications in which the page flipping mode can be invoked. Such a configuration feature may be helpful, for instance, in a tablet or laptop or other multifunction computing device that can execute different applications (as opposed to a device that is more or less dedicated to a particular application). In such an example, the available applications may be provided along with a corresponding check box, pull-down menu, or some other suitable UI feature. Example applications may include an eBook application, a word processor application, and a document or file viewer application, which are just a few examples. In one example, the page flipping mode may be enabled in a file viewing application (such as a photo viewing application), and the page flipping mode may treat each individual file as an individual page. Any number of applications or device functions may benefit from a page flipping mode as provided herein, whether user-configurable or not, and the claimed invention is not intended to be limited to any particular application or set of applications.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an example of how a page flipping mode may be configured by the user, and numerous other configurable or hard-codable aspects will be apparent in light of this disclosure. Note that in some embodiments the page flipping mode may be visually and/or aurally demonstrated or otherwise confirmed to the user via animations or sound effects. Such animations and sound effects provide clarity to the function being performed or otherwise enhance the user experience. In some embodiments, the animations and/or sound effects may be user-configurable, while in other embodiments they are hard-coded.

Figure 2A:
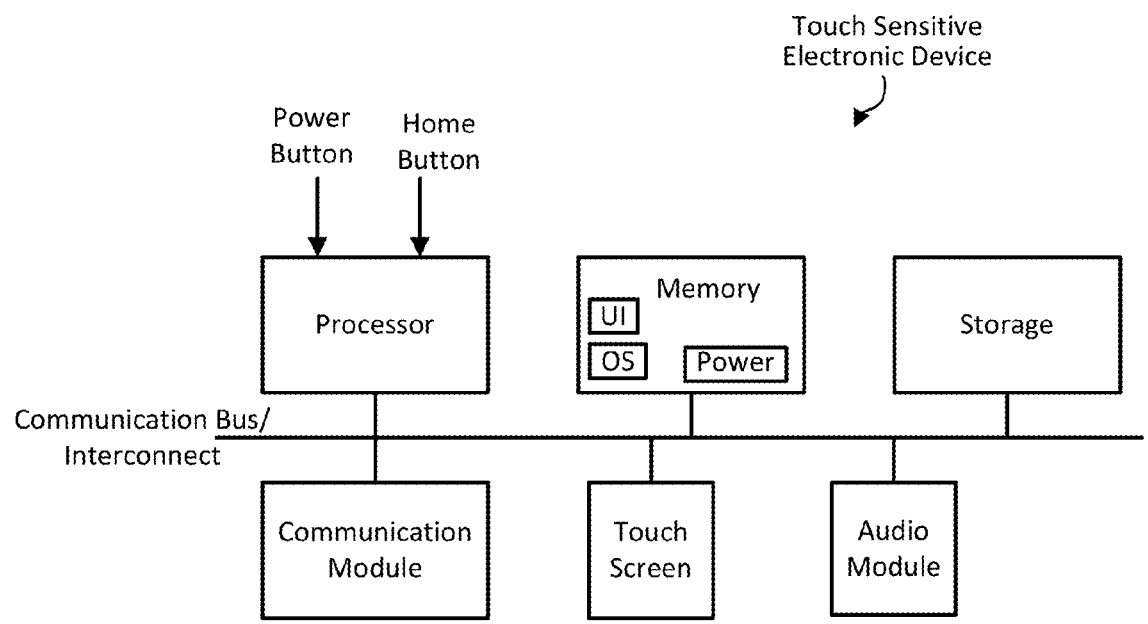
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a page flipping mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology with. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots and use-case scenarios shown in FIGS. 1a, 1c-d, 3a-e, 4a-d, 5a-e, and 6a-d, and in conjunction with the page flipping mode methodologies demonstrated in FIG. 7, which will be discussed in turn. The audio module can be configured to speak or otherwise aurally present, for example, a selected eBook, or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
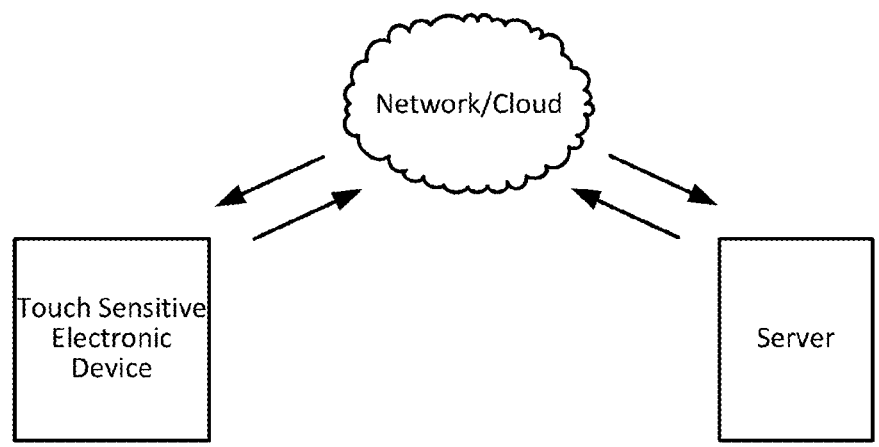
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a page flipping mode as provided herein to the touch screen device (e.g., via JavaScript or other browser based technology). In other embodiments, portions of the page flipping methodology are executed on the server and other portions of the methodology are executed on the device. Numerous server-side/client-side execution schemes can be implemented to facilitate a page flipping mode in accordance with an embodiment, as will be apparent in light of this disclosure.

Page Flipping Mode Examples

Figure 3A:
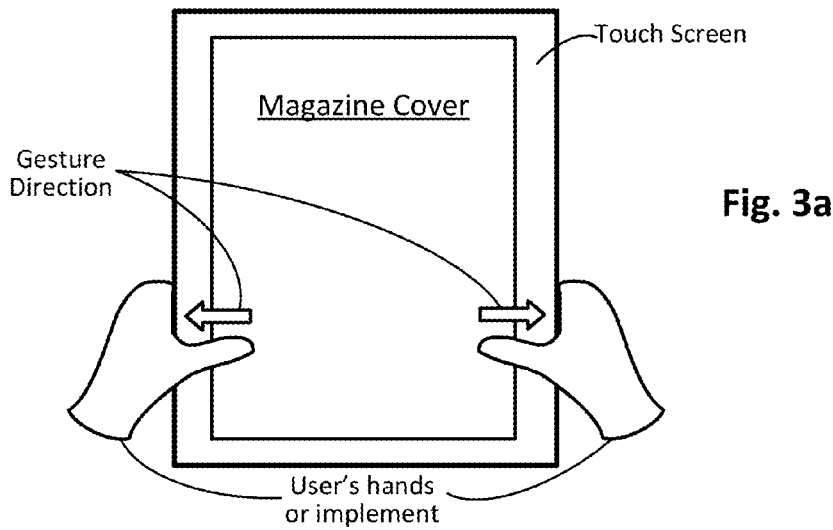
FIGS. 3a-e illustrate an example magazine page flipping mode of an electronic touch screen device, in accordance with an embodiment of the present invention.
Figure 3B:
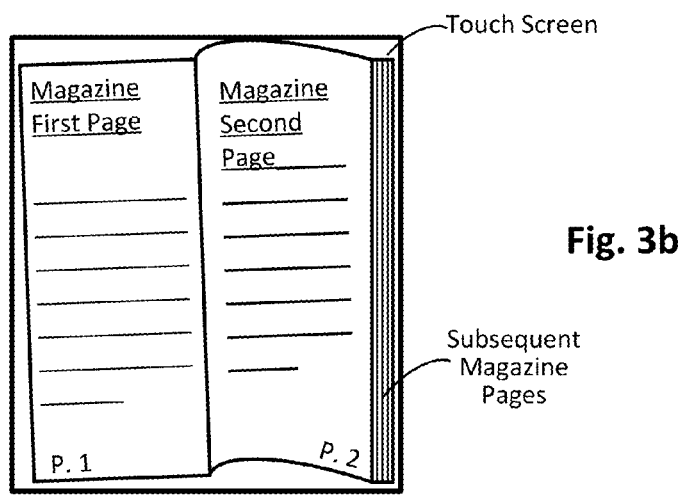
Figure 3C:
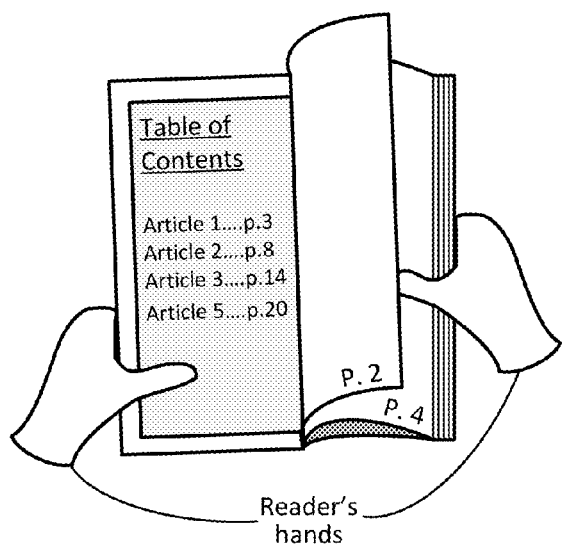

FIGS. 3a-b, and 3d-e collectively illustrate an example page flipping mode that can be applied to a touch sensitive display of an electronic device, in accordance with an embodiment of the present invention. As can be seen, the touch screen of the device is displaying the cover of a magazine and the user can interact with the touch screen using one or more hands or some other suitable implement. In the particular example shown in FIG. 3a, the user has enabled the magazine flip function (e.g., using the configuration sub-menu of FIG. 1d), such that an initial activation gesture may cause the device to enter a magazine page flipping mode. In this example, the activation gesture includes two simultaneous swipe gestures each oriented toward opposite edges of the device screen and the user performs this gesture with the thumbs of both hands, thus mimicking the action of opening a physical magazine or book. FIG. 3b shows an example of the magazine flip function with page 1 of the magazine on the left lying flat and slightly angled, as a physical magazine might appear, and having the opposite page curled up and showing less than the entire contents of page 2. As can be further seen, the edges of a number of subsequent pages are visible at the edge of the curled page. Referring now to FIG. 3c, an example image of a reader's hands flipping through a physical magazine is shown, in order to illustrate how the magazine page flipping mode described in reference to FIGS. 3a-b and 3d-e mimics the experience of browsing through a physical magazine or book.

Figure 3D:
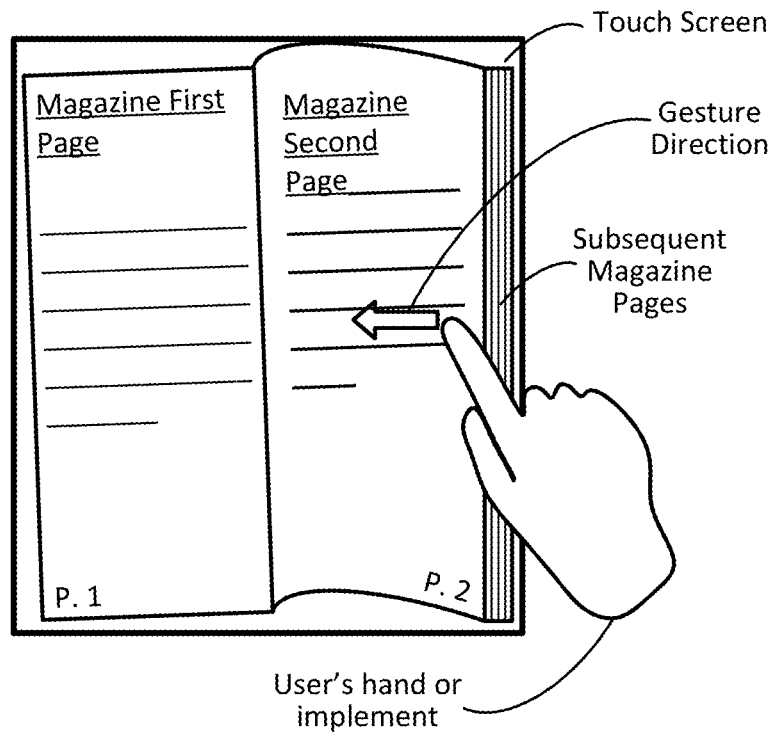
Figure 3E:
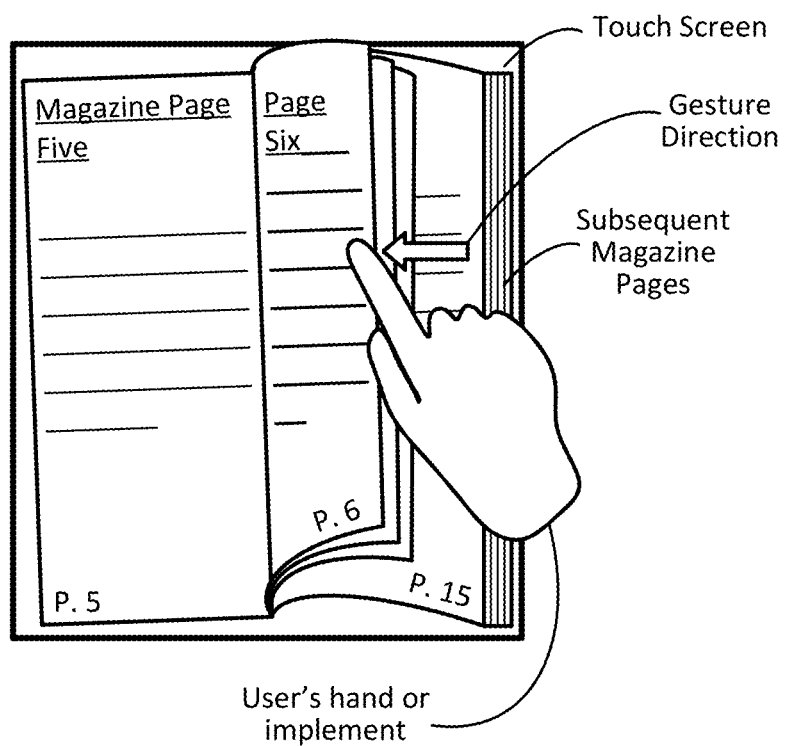

In the example shown in FIG. 3d, the user can hold the device with the left hand and perform the page flipping gesture with the right hand. In this particular example, the user performs a swipe gesture over page 2 of the magazine from the right edge of the screen toward the centerfold of the magazine. As can be seen in the example of FIG. 3e, as the user performs the swipe gesture the magazine page flipping mode displays a page turning animation such that the user can browse through the magazine pages. The number of pages flipped through and the speed of the page flipping animation may depend on the speed or length of the swipe gesture or the distance of the swipe gesture from the edge of the pages being displayed. For example, a short swipe gesture may turn through only 5 pages, while a longer gesture may turn 20 pages. Likewise, a fast swipe might turn 20 pages while a slow swipe might only turn 5 pages. FIG. 3e shows that the user has already flipped past pages 1-4 of the magazine and is flipping to page 15. In a similar fashion, performing a swipe gesture from left to right over page 5 of the magazine may reverse the animation and show the pages flipping back toward page 1. In some embodiments, as each page flips past the center of the magazine a portion of that page is visible to the user, such that contents of each page are briefly previewed. FIG. 3e shows a portion of page 6 being displayed to the user. In one example, the swipe gesture shown in FIG. 3e can be a continuation of the gesture shown in FIG. 3d. As long as the user doesn't release the contact point in 3e, the fast flip mode will flip the page with a default speed; and if the user contact continues to move the speed of the page flipping animation may increase, in some embodiments.

Figure 4A:
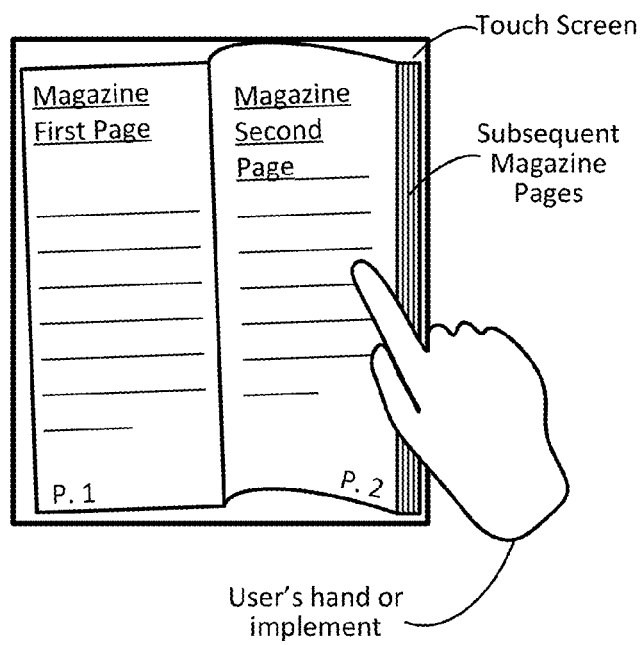
FIGS. 4a-d illustrate an example page flipping mode of an electronic touch screen device, in accordance with an embodiment of the present invention.
Figure 4B:
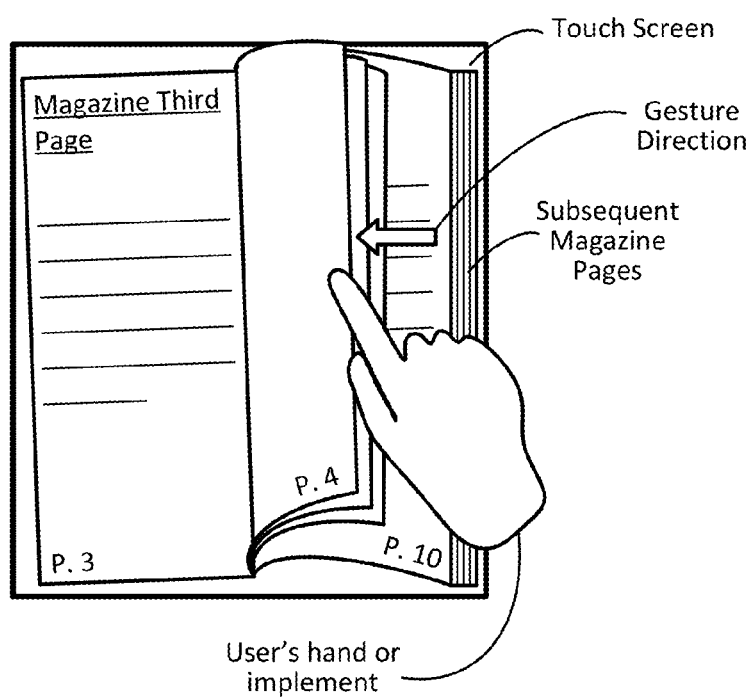
Figure 4C:
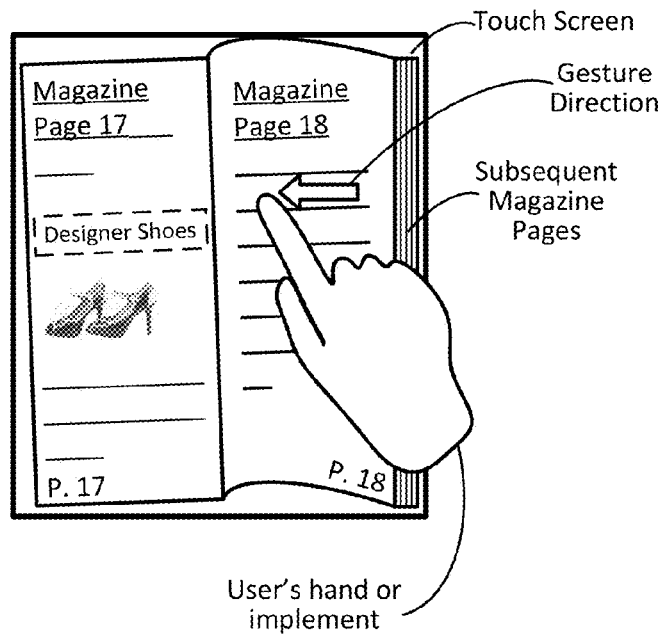
Figure 4D:
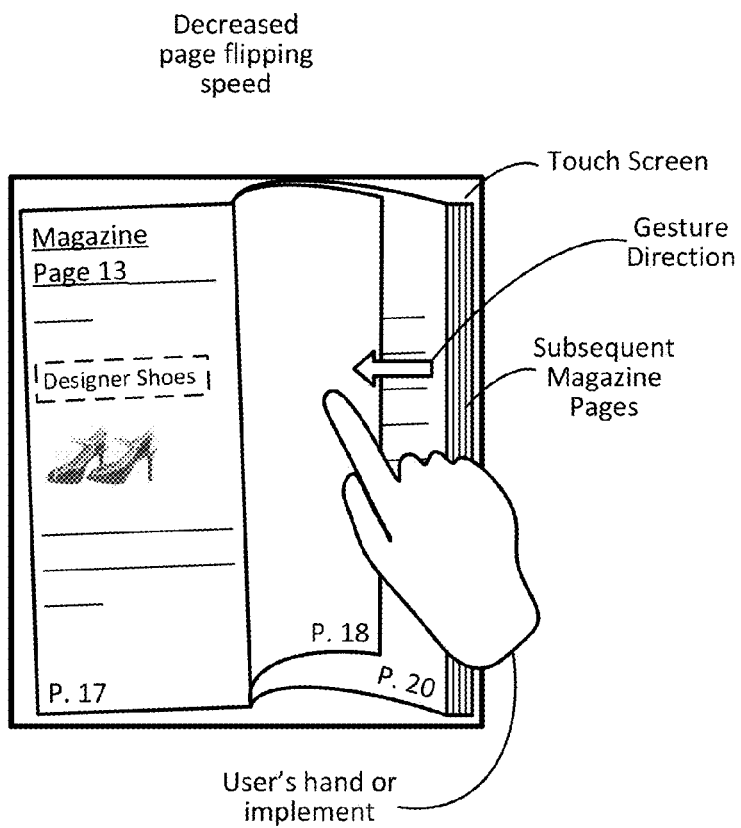

FIGS. 4a-d collectively illustrate an example page flipping mode with an interest-based scrolling/flipping function enabled, that can be applied to a touch sensitive display of an electronic device in accordance with an embodiment of the present invention. As can be seen, in this particular example the magazine page flipping mode has been activated as described in reference to FIG. 3b, and the touch screen of the device is displaying the first two pages of a magazine. The user may interact with the touch screen using one or more hands, a stylus, or some other suitable implement. In this example, the user has enabled the interest-based scrolling/flipping function and has identified "designer shoes" as one of the user's particular interests (e.g., using the configuration sub-menu shown in FIG. 1d). As can be seen in the example of FIG. 4b, as the user performs a swipe gesture the magazine page flipping mode displays a page turning animation such that the user can browse through the magazine pages. As discussed above, the number of pages flipped through and the speed of the page flipping animation may depend on the speed or length of the swipe gesture or the distance of the swipe gesture from the edge of the pages being displayed. FIG. 4b shows that the user has already flipped past the first two pages of the magazine and is flipping to page 10. However, if the user is making a cursory preview of a magazine, a reference to designer shoes or some other user interest might be passed over without catching the user's attention. In the example shown in FIG. 4c, the user has performed a second swipe gesture of equal length and speed, but instead of scrolling/flipping until reaching page 20, the scrolling/flipping stops on page 17 because this page contains a reference to designer shoes. As can be seen, the reference to designer shoes on page 17 is also highlighted in this example embodiment, further attracting the user's attention to the product of interest. Such optional outlining or highlighting may assist in attracting the user's attention. In the example shown in FIG. 4d, the page flipping speed simply decreases when it reaches page 17 instead of completely stopping. The decreased page flipping speed and the content highlighting helps catch the reader's attention while previewing the magazine. As previously explained, in some cases, the page flipping mode can be programmed or otherwise configured to skip pages with no content of interest to further assist in focusing the reader's attention.

Figure 5A:
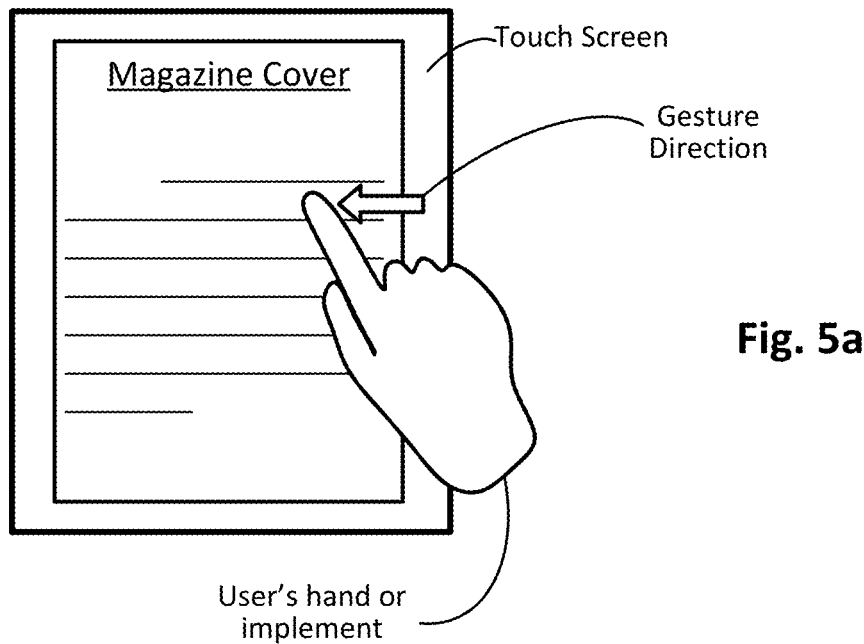
FIGS. 5a-e illustrate an example page flipping mode of an electronic touch screen device, in accordance with another embodiment of the present invention.
Figure 5B:
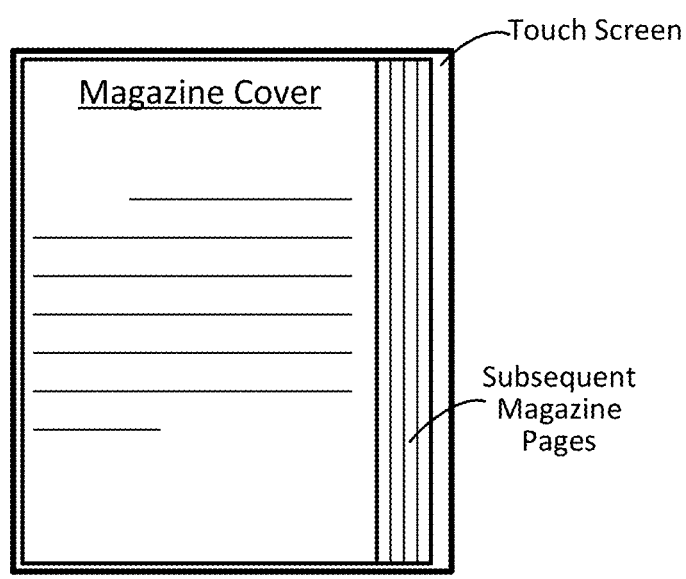

FIGS. 5a-b, and 5d-e collectively illustrate an example page flipping mode that can be applied to a touch sensitive display of an electronic device, in accordance with an embodiment of the present invention. As can be seen, the touch screen of the device is displaying the cover of a magazine and the user can interact with the touch screen using one or more hands or some other suitable implement. In the particular example shown in FIG. 3a, the user has enabled the fast flip function (e.g., using the configuration sub-menu of FIG. 1d), such that an initial activation gesture may cause the device to enter a fast page flipping mode. In this example, the activation gesture includes a single swipe gesture oriented from the right edge of the magazine page toward the center of the page and the user performs this gesture with the index finger of the right hand. FIG. 5b shows an example of the fast flip function displaying the magazine cover and showing the edges of a number of subsequent pages at the right edge of the magazine cover.

Figure 5C:
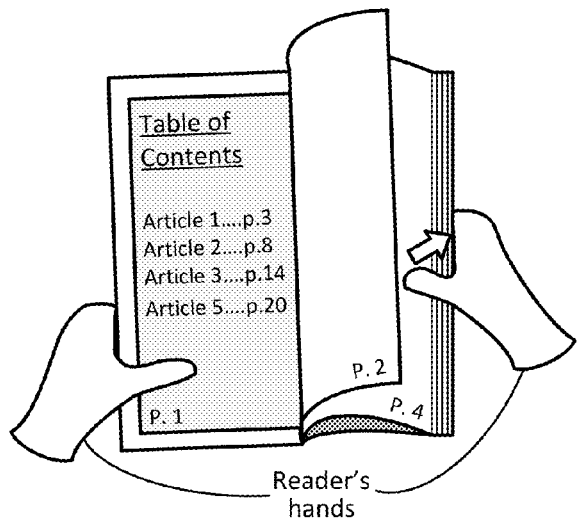
Figure 5D:
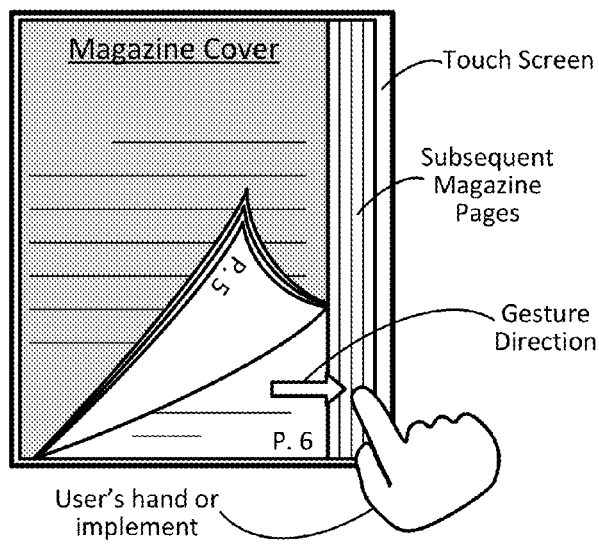
Figure 5E:
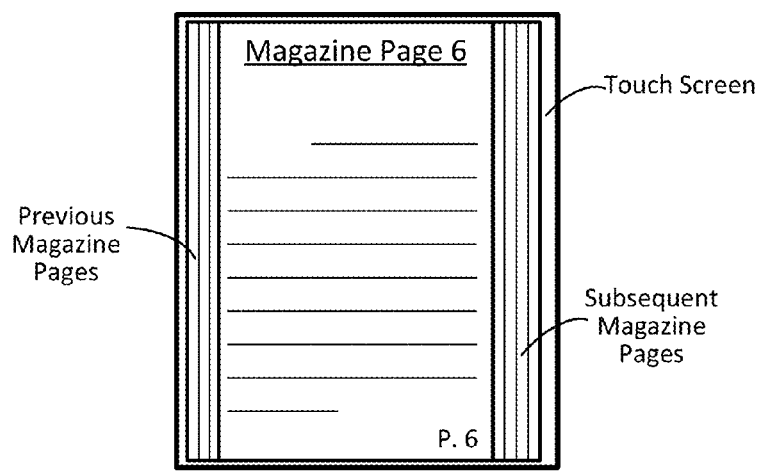

Referring now to FIG. 5c, an example image of a reader's hands flipping through a physical magazine is shown, in order to illustrate how the fast flip function described in reference to FIGS. 5a-b and 5d-e mimics the experience of flipping through a physical magazine or book. When the user moves the right thumb toward the right, the magazine pages begin flipping, thus exposing the subsequent pages. Likewise, the fast flip gesture in this example embodiment is a left-to-right swipe or flick gesture as shown in FIG. 5d. In other embodiments, however, the gesture may be from right-to-left, or any other suitable touch screen gesture. In this particular example, when the user performs the fast flip gesture the magazine cover may be shaded and folded up at one corner to expose a portion of the following pages. As previously explained, the number of pages being flipped through and the speed of the page flipping animation may depend, for example, on the speed or length of the fast flip gesture or the distance of the gesture from the edge of the pages being displayed. In one such example, performing a slow swipe gesture allows the user to preview portions of the magazine slowly; ending the swipe gesture whenever the user wishes to land on a page being previewed. After completing the fast flip gesture and removing the user's finger from contact with the touch screen device, the user lands on whichever page was being previewed. In the example shown in FIG. 5e, the user lands on page 6 of the magazine after performing the fast flip gesture. In this specific example, after landing on page 6 the edges of a number of previous pages may be displayed on the left edge of page 6. In such an example, a fast flick gesture at the left edge of page 6 might allow the user to preview the previous pages in a similar fashion.

Figure 6A:
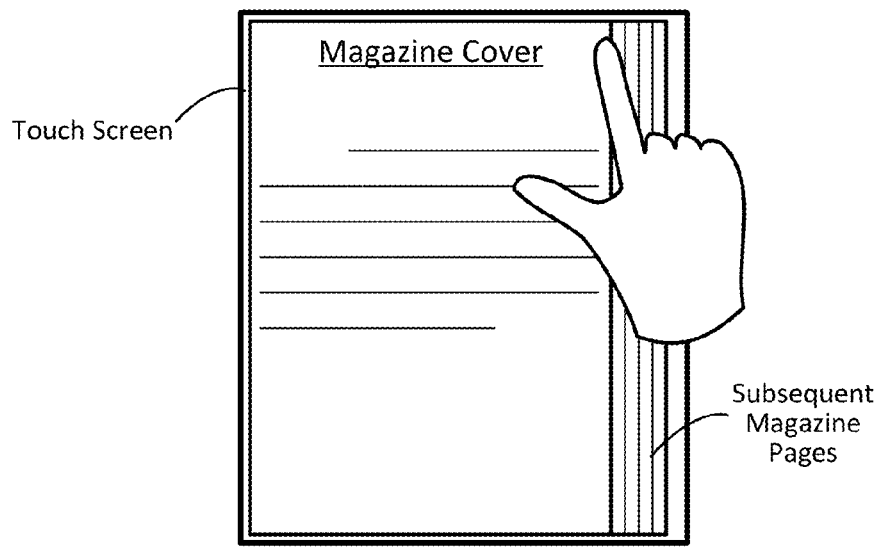
FIGS. 6a-d illustrate an example page flipping mode of an electronic touch screen device, in accordance with another embodiment of the present invention.
Figure 6B:
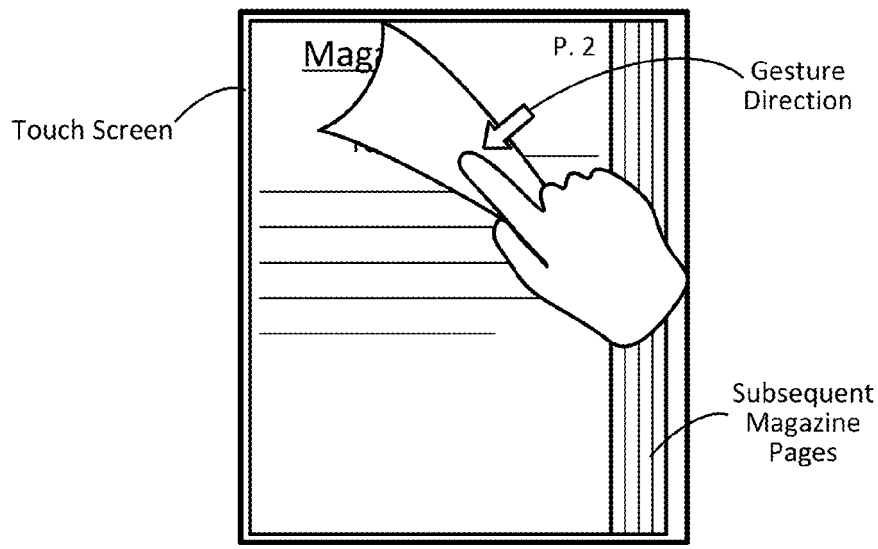
Figure 6C:
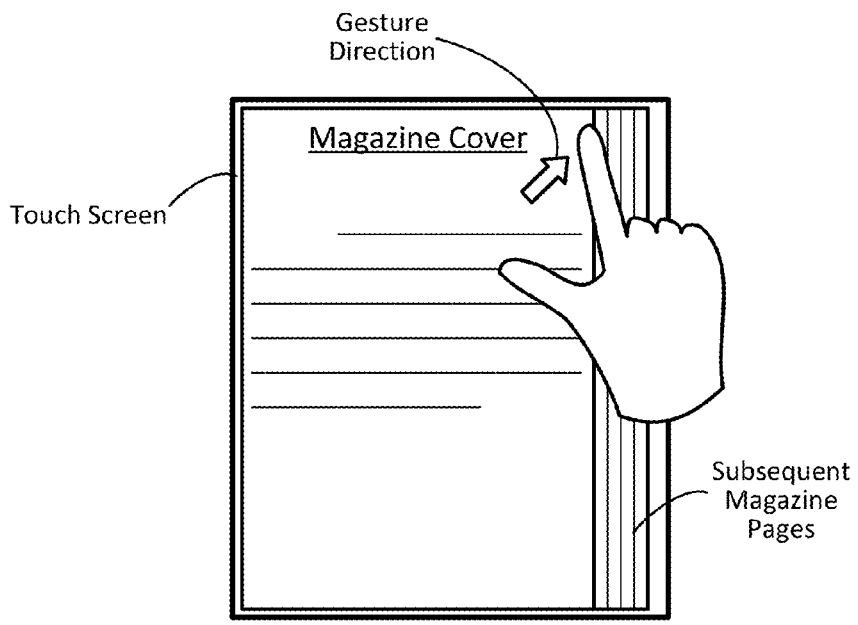
Figure 6D:
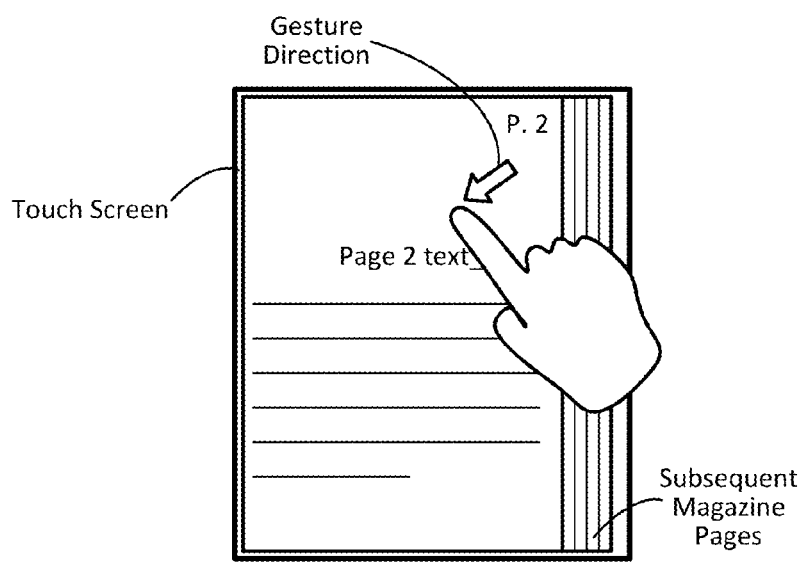

FIGS. 6a-d collectively illustrate an example page flipping mode with a page preview function enabled, that can be applied to a touch sensitive display of an electronic device in accordance with an embodiment of the present invention. As can be seen, in this particular example the page flipping mode has been activated as described in reference to FIG. 5b, and the touch screen of the device is displaying the cover of a magazine. Furthermore, the edges of a number of subsequent pages are visible at the right edge of the magazine cover page. In this example, the user may interact with the touch screen using one or more hands, a stylus, or some other suitable implement, and the user has enabled the page preview function (e.g., using the configuration sub-menu shown in FIG. 1d). As shown in the example in FIG. 6a, the user contacts the cover page with both the thumb and index finger and performs an inward pinching gesture by bringing the index finger toward the thumb, as illustrated in FIG. 6b. In such an embodiment, the corner of the cover page may be shown to fold up and expose a portion of the next two pages. This gesture mimics the way a reader might hold down a page with the thumb and flick through a book with the index finger to preview following pages. As such, the number of pages being folded up may depend on the number of pinching gestures performed, in one particular embodiment. In another embodiment, after previewing the following pages the user may reverse the pinch gesture and return to the cover page, as shown in FIG. 6c. Alternatively, removing all contact points from the touch screen may return the magazine to the cover page in some embodiments. After previewing the second page, if the user wishes to open the magazine to page 2, lifting the thumb contact which is holding down the cover page and performing a swipe gesture with the index finger can land the user on page 2. As discussed above, although the page preview function is described and illustrated with reference to the user's thumb and finger, the function may be performed with any two contact points whether they are fingers, styli, or some other suitable implements.

Methodology

Figure 7:
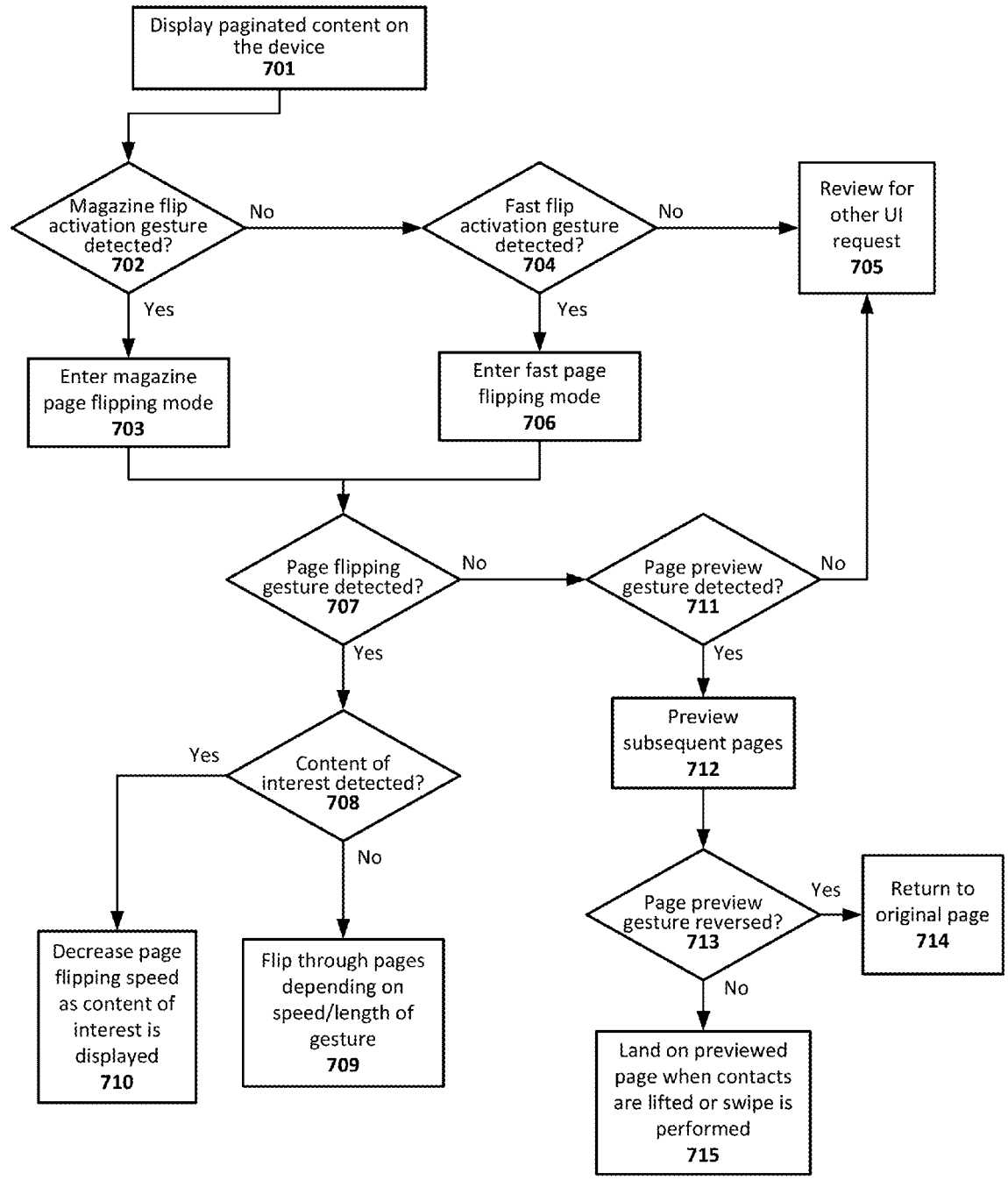
FIG. 7 illustrates a method for providing a page flipping mode in an electronic touch screen device, in accordance with an embodiment of the present invention.

FIG. 7 illustrates a method for providing a page flipping mode in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the UI may be implemented in software, hardware, firmware, or any suitable combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a page flipping mode as variously described herein, as will be appreciated in light of this disclosure. Note also, that the example activation gestures and page flipping gestures described below are for illustrative purposes only, and the present invention is not intended to be limited to any particular type or combination of gestures.

In this example case, the method includes displaying 701 content on the touch sensitive device that is paginated or otherwise similarly divided. Examples of such content may include an eBook, a magazine, a multi-page text document, or a slideshow, just to name a few. Once it has been determined that the user is viewing paginated content, the method may continue with determining 702 whether a magazine page flipping activation gesture has been detected at the touch sensitive surface. In one particular embodiment, the magazine page flipping activation gesture may include two simultaneous swipe gestures each oriented toward opposite edges of the content being displayed. Such an activation gesture may be performed with the thumbs of each hand while holding the device with both hands, in some embodiments. If the magazine page flipping activation gesture is detected, the method may continue with entering 703 the magazine page flipping mode. In one example embodiment, the magazine page flipping mode shows one page of the magazine on the left lying flat and slightly angled, as a physical magazine might appear, and having the opposite page curled up and showing less than the entire contents of the opposite page. In one such example, the edges of a number of subsequent pages are visible at the edge of the curled opposing page.

If, the magazine page flipping activation gesture has not been detected at 702, the method may continue with determining 704 whether a fast page flipping activation gesture has been detected at the touch sensitive surface. In one particular embodiment, the fast page flipping activation gesture may include a single swipe gesture from the right edge or bezel of the device oriented toward the center of the device. If the fast page flipping activation gesture is not detected, the contact may be reviewed 705 for other UI requests. If the fast page flipping activation gesture is detected, the method may continue with entering 706 the fast page flipping mode. In one example embodiment, the fast page flipping mode shows the first page of the paginated content, as well as the edges of a number of subsequent pages at the right edge of the first page.

The method may continue with determining 707 whether a page flipping gesture is detected. If the magazine page flipping mode is activated, the page flipping gesture may be a swipe or flick gesture from the edge of the page toward the centerfold of the magazine, in some example embodiments. If the fast page flipping mode is activated, the page flipping gesture may be a swipe gesture from the center of the device screen toward the edge of the screen, in some example embodiments. If the page flipping gesture is detected, the method may continue with determining 708 if content of interest to the user is contained within the pages that are to be flipped through. If no content of interest to the user is contained within the pages being flipped through, or if the interest-based scrolling/flipping function is not enabled, the method may continue with flipping 709 through the paginated content. Note that the number of pages being flipped through, as well as the speed of the page flipping animation, may depend upon the speed and/or length of the page flipping gesture, or the duration of the gesture. In some embodiments, flipping through paginated content may include an animation showing an opened magazine or book with the left-hand pages lying flat and one or more curled pages folding over the centerfold of the magazine, as shown in the example in FIG. 3*e*. In other embodiments, flipping through paginated content may include an animation showing one or more pages folding upward at one corner to display a portion of the subsequent pages, as shown in the example in FIG. 5*d*. In one such embodiment, the portion of the first page still visible to the user may have a diminished or faded appearance while subsequent pages are being flipped through.

If, however, content of interest to the user is contained within the pages that are to be flipped through, the method may continue with decreasing 710 the page flipping speed as the content of interest is being displayed to the user. In order to catch the user's attention, in some embodiments the page flipping animation may pause or even stop entirely on a page containing content that the user is interested in. In other embodiments, the content of interest may appear highlighted. In other embodiments, pages with no content of interest are skipped. In some cases, specific types of content that a user is interested in may be entered by the user via a configuration sub-menu (e.g., the sub-menu of FIG. 1*d*) or some other user input technique, while in other cases a third party (such as the professor of a class the user is enrolled in) may define what content is of increased interest to the user.

If no page flipping gesture is detected at 707, the method may continue with determining 711 whether a page preview gesture is detected at the touch sensitive surface. In one particular embodiment, the page preview gesture may include a double contact on a magazine cover page (e.g., contacting the touch screen with both the thumb and index finger) and performing an inward pinching gesture (e.g., by bringing the index finger toward the thumb), as illustrated in FIG. 6*b*. If the page preview gesture is not detected, the contact may be reviewed 705 for some other UI request. If the page preview gesture is detected, the method may continue with previewing 712 a portion of the following pages. The following pages may be previewed by showing one or more pages curling upward to expose a portion of the following pages, as shown in the example in FIG. 6*b*. This particular gesture mimics the way a reader might hold down a page with the thumb and flick through a book with the index finger to preview following pages. As such, the number of pages being folded upward may depend on the number of pinching gestures performed, in one particular embodiment. The method may continue with determining 713 if the page preview gesture is reversed (e.g., by performing an outward pinch with the index finger). If the preview gesture is reversed, the method may continue with returning to the original page (the magazine cover page in this example). If the preview gesture is not reversed, the method may continue with displaying the page currently being previewed when either the contacts are lifted from the touch sensitive surface, or a swipe gesture is performed. Note that although the page preview function is described with reference to the user's thumb and index finger, the function may be performed using any two contact points whether they are fingers, styli, or some other suitable implements.

Numerous variations and embodiments will be apparent in light of this disclosure. One example embodiment of the present invention provides a device including a touch screen display for displaying digital content to a user and allowing user input. The device also includes a user interface including a page flipping mode that can be activated in response to an activation gesture, wherein the page flipping mode is configured to flip through at least one page in response to a page flipping gesture, and wherein at least one of page flipping speed and/or the number of pages flipped through is determined by the page flipping gesture's speed and/or duration (wherein duration refers to, for instance, the length of a swipe gesture or hold time of a press and hold gesture). In some cases, the activation gesture includes two simultaneous swipe gestures oriented toward opposite edges of the touch screen display. In some cases, the activation gesture includes a swipe gesture and/or a press-and-hold gesture performed over paginated content. In some cases, the page flipping mode is further configured to show a graphic of paginated content in a stack and an edge of that content stack appears slanted or staircased as previously explained, and wherein a page flipping animation commences in response to the activation gesture being received on or near the slanted or staircased edge. In some cases, the page flipping mode is further configured to display a page flipping animation in response to a page flipping gesture, the animation showing a corner of at least one page folded upwards to display a corner portion of an adjacent page. In some cases, the page flipping gesture includes a double-contact inward pinch gesture. In some such cases, the page flipping mode is further configured to display a corner portion of at least one subsequent page in response to the inward pinch gesture. In addition, or alternatively, the page flipping gesture includes a press and hold gesture. In some cases, at least one area of interest may be identified by the page flipping mode. In some such cases, the page flipping mode is further configured to decrease page flipping speed when content related to the at least one area of interest is being displayed to the user. In other such cases, the page flipping mode is further configured to stop flipping pages when content related to the at least one area of interest is being displayed to the user. In other such cases, the page flipping mode is further configured to highlight any content displayed to the user related to the at least one area of interest and/or skip pages having no area of interest.

Another example embodiment of the present invention provides a mobile computing system including a processor and a touch screen display for displaying content to a user and allowing user input, and a user interface executable on the processor and including a page flipping mode that can be activated in response to an activation gesture via the touch screen display, wherein the page flipping mode is configured to flip through at least one page in response to a page flipping gesture, and wherein at least one of page flipping speed and/or the number of pages flipped through is determined by the page flipping gesture's speed and/or duration (again, duration may refer to length of a swipe gesture or hold time of a press and hold gesture). In some cases, the page flipping mode is further configured to receive input of at least one area of interest and to decrease page flipping speed when content related to the at least one area of interest is being displayed to the user.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive at the electronic device a page flipping mode activation gesture, enter a page flipping mode, receive at the electronic device a page flipping gesture, and display a page flipping animation showing at least one page flipping, wherein the page flipping gesture's speed and/or duration determines the number of pages being flipped and/or the speed of the page flipping animation. In some cases, the page flipping mode shows a graphic of paginated content in a stack and an edge of that content stack appears slanted or staircased as previously explained, and wherein a page flipping animation commences in response to the page flipping gesture being received on or near the slanted or staircased edge. In some cases, at least one page of the opposing side of the book is shown turning over to expose an adjacent page. In some cases, at least one area of interest may be identified by the page flipping mode, and wherein pages having no area of interest are skipped in the page flipping animation. In some cases, the page flipping mode shows a first page lying flat, and wherein edges of a plurality of subsequent pages are visible behind the first page. In some such cases, the page flipping animation shows a corner of at least one page folded upwards to display a corner portion of an adjacent page. In other such cases, the page flipping gesture includes a swipe gesture and the page flipping animation returns to displaying the first page in response to the page flipping swipe gesture being retraced. In some cases, the page flipping gesture includes a double-contact inward pinch gesture. In some such cases, the page flipping animation is further configured to display a corner portion of at least one subsequent page in response to the inward pinch gesture. In some cases, the process further includes: receiving at the electronic device at least one area of interest, and the page flipping animation speed decreases, pauses, or stops when content related to the at least one area of interest is displayed to the user.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
   a touch screen display for displaying paginated digital content to a user and allowing user input; and
   a user interface including a page flipping mode that can be activated in response to an activation gesture performed on paginated digital content, wherein the page flipping mode is configured to flip through at least one page of the paginated digital content in response to a page flipping gesture, and wherein at least one of page flipping speed and/or the number of pages flipped through is determined based on the page flipping gesture's speed and/or duration;
   wherein the page flipping mode is user-configurable such that at least one of page flipping speed, page flipping stop points, and page skipping are determined based on one or more user-provided areas of interest, and the page flipping mode changes how the paginated digital content is presented based on the areas of interest; and
   wherein user input independent of the activation gesture can be provided to turn one page of the paginated digital content at a time.

2. The device of claim 1 wherein the activation gesture comprises two simultaneous swipe gestures oriented toward opposite edges of the touch screen display.

3. The device of claim 1 wherein the activation gesture comprises a swipe gesture and/or a press-and-hold gesture performed over paginated content.

4. The device of claim 1 wherein the page flipping mode is further configured to show a graphic of paginated content in a stack and an edge of that content stack appears slanted or staircased, and wherein a page flipping animation commences in response to the activation gesture being received on or near the slanted or staircased edge.

5. The device of claim 1 wherein the page flipping mode is further configured to display a page flipping animation in response to a page flipping gesture, the animation showing a corner of at least one page folded upwards to display a corner portion of an adjacent page.

6. The device of claim 1 wherein the page flipping gesture includes a double-contact inward pinch gesture, and wherein the page flipping mode is further configured to display a corner portion of at least one subsequent page in response to the inward pinch gesture.

7. The device of claim 1 wherein the page flipping mode is user-configurable such that page flipping speed is determined based on the one or more user-provided areas of interest, and wherein the page flipping mode decreases page flipping speed when a page including the one or more areas of interest is about to be displayed and/or is being displayed.

8. The device of claim 1 wherein the page flipping mode is user-configurable such that one or more page flipping stop points are determined based on the one or more user-provided areas of interest, and wherein the page flipping mode stops flipping through pages when a page including the one or more areas of interest is displayed until additional user input is provided.

9. The device of claim 1 wherein the page flipping mode is user-configurable such that one or more pages to be skipped during page flipping are determined based on the one or more user-provided areas of interest, and wherein the one or more pages skipped are pages that do not include the one or more areas of interest.

10. The device of claim 1 wherein the page flipping mode is further configured to highlight any content displayed to the user related to the one or more areas of interest.

11. A mobile computing system, comprising:
    a processor and a touch screen display for displaying paginated digital content to a user and allowing user input; and
    a user interface executable on the processor and including a page flipping mode that can be activated in response to an activation gesture performed via the touch screen display on paginated digital content, wherein the page flipping mode is configured to flip through at least one page of the paginated digital content in response to a page flipping gesture, and wherein at least one of page flipping speed and/or the number of pages flipped through is determined based on the page flipping gesture's speed and/or duration;
wherein the page flipping mode is further configured to display a portion of a page not currently being displayed in response to a first contact point being held on a displayed page in combination with the page flipping gesture being performed via a second contact point; and
wherein user input independent of the activation gesture can be provided to turn one page of the paginated digital content at a time.

12. The system of claim 11 wherein the page flipping mode is user-configurable such that at least one of page flipping speed, page flipping stop points, and page skipping are determined based on one or more user-provided areas of interest, and the page flipping mode changes how the paginated digital content is presented based on the areas of interest.

13. A computer program product comprising a plurality of instructions non-transiently encoded thereon to facilitate operation of an electronic device according to the following process:
receive at the electronic device a page flipping mode activation gesture performed on paginated digital content;
enter a page flipping mode;
receive at the electronic device a page flipping gesture; and
display a page flipping animation showing at least one page of paginated digital content flipping, wherein the number of pages being flipped and/or the page flipping speed is controlled by the distance of a contact point of the page flipping gesture from an edge of the electronic device;
wherein user input independent of the activation gesture can be provided to turn one page of the paginated digital content at a time.

14. The computer program product of claim 13 wherein the page flipping mode shows a graphic of paginated content in a stack and an edge of that content stack appears slanted or staircased, and wherein the page flipping animation commences in response to the page flipping gesture being received on or near the slanted or staircased edge.

15. The computer program product of claim 13 wherein the page flipping mode is user-configurable such that at least one of page flipping speed, page flipping stop points, and page skipping are determined based on one or more user-provided areas of interest, and the page flipping mode changes how the paginated digital content is presented based on the areas of interest.

16. The computer program product of claim 15 wherein the page flipping mode is further configured to allow specific content within the paginated digital content to be selected as the one or more areas of interest.

17. The computer program product of claim 16 wherein the page flipping speed is controlled by the distance of the contact point of the page flipping gesture from an edge of the electronic device.

18. The computer program product of claim 17 wherein the page flipping speed is increased as the distance of the contact point of the page flipping gesture from the edge of the electronic device is increased.

19. The computer program product of claim 15 wherein the page flipping mode is further configured to present a text box to allow entry of the one or more areas of interest.

20. The computer program product of claim 13 wherein the process further comprises: display a portion of a page not currently being displayed in response to a first contact point being held on a displayed page in combination with the page flipping gesture being performed via a second contact point.

* * * * *